US011926724B2

(12) United States Patent
Taniyama et al.

(10) Patent No.: US 11,926,724 B2
(45) Date of Patent: Mar. 12, 2024

(54) METHOD FOR MANUFACTURING FOAM RUBBER

(71) Applicant: ZEON CORPORATION, Tokyo (JP)

(72) Inventors: Tomoya Taniyama, Tokyo (JP); Hidekazu Haneda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/628,123

(22) PCT Filed: Jul. 10, 2018

(86) PCT No.: PCT/JP2018/025972
§ 371 (c)(1),
(2) Date: Jan. 2, 2020

(87) PCT Pub. No.: WO2019/017239
PCT Pub. Date: Jan. 24, 2019

(65) Prior Publication Data
US 2020/0369846 A1 Nov. 26, 2020

(30) Foreign Application Priority Data
Jul. 19, 2017 (JP) ................................. 2017-140029

(51) Int. Cl.
*C08J 9/30* (2006.01)

(52) U.S. Cl.
CPC ............. *C08J 9/30* (2013.01); *C08J 2309/04* (2013.01)

(58) Field of Classification Search
CPC ................................ C08J 9/30; C08J 2309/04
USPC .......................................................... 521/65
See application file for complete search history.

(56) References Cited

U.S. PATENT DOCUMENTS 2,594,217 A * 4/1952 Walter ................... C08L 21/00
521/71
6,051,616 A 4/2000 Balk et al.

FOREIGN PATENT DOCUMENTS

| GB | 1239554 | * 7/1971 | ............. C08D 13/08 |
| JP | H11-080440 A | 3/1999 | |
| JP | 4741837 B2 | 8/2011 | |
| JP | 2014-088536 A | 5/2014 | |

OTHER PUBLICATIONS

Machine translation of JP 2004-204148 by Hatta et al. (Year: 2004).*
Machine translation of JP 2003-301083 by Isoda et al. (Year: 2003).*
Owen, M.J. (2001). Defoamers. In Kirk-Othmer Encyclopedia of Chemical Technology, (Ed.). https://doi.org/10.1002/ 0471238961. 0405061515230514.a01.pub2 (Year: 2001).*
Syuji Fujii, Anthony J. Ryan, and Steven P. Armes. Long-Range Structural Order, Moire Patterns, and Iridescence in Latex-Stabilized Foams. J. AM. CHEM. SOC. 2006, 128, 7882-7886. (Year: 2006).*
Syuji Fujii, Anthony J. Ryan, and Steven P. Armes. Supporting Information for Long-Range Structural Order, Moire Patterns, and Iridescence in Latex-Stabilized Foams. J. AM. CHEM. SOC. 2006, 128, 7882-7886 (Year: 2006).*
Joseph, Rani. "Latex Foam". Handbook of polymer foams. 2004. pp. 207-241. (Year: 2004).*
Machine translation of EP 0844273 by Van der Most et al. (Year: 1998).*
Chu, F. et al. High Solid Content Multisized Emulsion Copolymerization of Styrene, Butyl Acrylate, and Methacrylic Acid. Journal of Applied Polymer Science, vol. 70, pp. 2667-2677. (Year: 1998).*
Mariz, I.F.A. et al. Control of particle size distribution for the synthesis of small particle size high solids content latexes. Polymer 51 (2010) 4044-4052. (Year: 2010).*
Oct. 2, 2018 International Search Report issued in International Patent Application No. PCT/JP2018/025972.
Jan. 20, 2021 Search Report issued in European Patent Application No. 18834901.3.
Jul. 20, 2022 Office Action issued in European Application No. 18 834 901.3.
Chandra Mouli R. Madhuranthakam et al, "Improved Operating Scenarios for the Production of Acrylonitrile-Butadiene Emulsions", Polymer Engineering and Science, vol. 53, pp. 9-20, Dec. 13, 2012.

* cited by examiner

Primary Examiner — Michael M Dollinger
Assistant Examiner — Christina H. W. Rosebach
(74) Attorney, Agent, or Firm — Oliff PLC

(57) ABSTRACT

A method for manufacturing a foam rubber by foaming a polymer latex is provided, wherein the polymer latex used has a solids content of 60.0 wt % or more, has a volume particle size distribution where the volume cumulative particle size d10 is more than 140 nm, and comprises 0.001 to 1.0 part by weight of antifoaming agent relative to 100 parts by weight of polymer in the polymer latex.

9 Claims, No Drawings

METHOD FOR MANUFACTURING FOAM RUBBER

TECHNICAL FIELD

The present invention relates to a method for manufacturing a foam rubber which allows appropriate foaming and provides a foam rubber having high resilience and durability.

BACKGROUND ART

Foam rubbers (rubber foams) produced using polymer lattices have been used in a variety of applications such as mattresses, puffs (cosmetic sponges), rolls, shock absorbers, and the like. Among these applications of foam rubber, in particular, foam rubbers used in puffs should have a favorable foaming state, have a uniform foamed structure, and have a good balance between resilience and a feel.

For example, Patent Document 1 discloses a method of producing a puff using a copolymer latex having a solids content, a gel content, and a Mooney viscosity controlled within specific ranges. Unfortunately, the puff produced by the technique disclosed in Patent Document 1 may have poor resilience and poor durability to the moisture contained in aqueous cosmetics in some cases.

RELATED ART DOCUMENTS

Patent Documents

Patent Document 1: JP-B 4741837

SUMMARY OF THE INVENTION

Technical Problem

The present invention has been made in consideration of such circumstances. An object of the present invention is to provide a method for manufacturing a foam rubber which allows appropriate foaming and manufacturing of a foam rubber having high resilience and durability.

Solution to Problem

The present inventors, who have conducted extensive research to achieve the above object, have found that the above object can be achieved by producing a foam rubber using a polymer latex in which the solids content, the volume cumulative particle size d10, and the content of an antifoaming agent are controlled within specific ranges, and have completed the present invention.

In other words, the present invention provides a method for manufacturing a foam rubber, comprising foaming a polymer latex, wherein the polymer latex used has a solids content of 60.0 wt % or more, has a volume particle size distribution where the volume cumulative particle size d10 is more than 140 nm, and comprises 0.001 to 1.0 part by weight of antifoaming agent relative to 100 parts by weight of polymer in the polymer latex.

In the method for manufacturing a foam rubber according to the present invention, in the volume particle size distribution of the polymer latex, the volume cumulative particle size d50 is preferably 400 nm or more.

In the method for manufacturing a foam rubber according to the present invention, in the volume particle size distribution of the polymer latex, the volume cumulative particle size d90 is preferably 1000 nm or more.

In the method for manufacturing a foam rubber according to the present invention, the volume particle size distribution of the polymer latex preferably has two or more maxima.

In the method for manufacturing a foam rubber according to the present invention, the polymer latex preferably has a ratio of a height $h_{2nd}$ to a height $h_{1st}$ ($h_{2nd}/h_{1st}$) of 1.8 or more, where the height $h_{1st}$ represents the height of the peak closest to the smaller diameter end of the volume particle size distribution, and the height $h_{2nd}$ represents the height of the second peak counted from the smaller diameter end of the particle size distribution.

In the method for manufacturing a foam rubber according to the present invention, the polymer forming the polymer latex is preferably a nitrile group-containing conjugated diene copolymer.

Advantageous Effects

The present invention can provide a method for manufacturing a foam rubber which allows appropriate control of foaming and manufacturing of a foam rubber having high resilience and durability.

DESCRIPTION OF EMBODIMENTS

The method for manufacturing a foam rubber according to the present invention is a method for manufacturing a foam rubber comprising foaming a polymer latex, wherein the polymer latex used has a solids content of 60.0 wt % or more, has a volume particle size distribution where a volume cumulative particle size d10 is more than 140 nm, and comprises 0.001 to 1.0 part by weight of antifoaming agent relative to 100 parts by weight of polymer in the polymer latex.

<Polymer Latex>

The polymer latex used in the present invention is a polymer latex having a solids content of 60.0 wt % or more, having a volume particle size distribution where the volume cumulative particle size d10 is more than 140 nm, and comprising 0.001 to 1.0 part by weight of antifoaming agent relative to 100 parts by weight of polymer in the polymer latex.

Any polymer can form such a polymer latex without limitation. Examples thereof include diene polymers, urethane polymers, acrylic polymers, fluorine-containing polymers, and silicone polymers. Among these polymers, diene polymers are preferred, and nitrile group-containing conjugated diene copolymers are particularly preferred because foam rubbers prepared from these polymers have higher resilience and durability. The polymer latex may also contain two or more polymers. Preferred is use of a latex containing a diene copolymer and a urethane polymer prepared by blending a latex of the diene copolymer and a latex of the urethane polymer, for example. In this blending, the latex of the diene copolymer blended with the latex of the urethane polymer is preferably a latex of a nitrile group-containing conjugated diene copolymer.

The nitrile group-containing conjugated diene copolymer is a copolymer prepared through copolymerization of a conjugated diene monomer and an ethylenically unsaturated nitrile monomer. The nitrile group-containing conjugated diene copolymer may be a copolymer prepared through copolymerization of these monomers and optionally a different ethylenically unsaturated monomer copolymerizable therewith.

Examples of the conjugated diene monomer include 1,3-butadiene, isoprene, 2,3-dimethyl-1,3-butadiene, 2-ethyl-1, 3-butadiene, 1,3-pentadiene, chloroprene, and the like. Among these diene monomers, preferred are 1,3-butadiene and isoprene. These conjugated diene monomers can be used alone or in combination. The content of the conjugated diene monomer unit famed of the conjugated diene monomer in the nitrile group-containing conjugated diene copolymer is preferably 20 to 95 wt %, more preferably 30 to 85 wt %, still more preferably 40 to 80 wt %. Control of the content of the conjugated diene monomer unit within this range results in a foam rubber having a better feel and higher durability. To provide a foam rubber having a better balance between the feel and the durability, use of both of 1,3-butadiene and isoprene is preferred, and the ratio of the 1,3-butadiene unit to the isoprene unit in the nitrile group-containing conjugated diene copolymer is preferably in the range of 5/5 to 9/1.

The ethylenically unsaturated nitrile monomer can be any ethylenically unsaturated monomer having a nitrile group without limitation. Examples thereof include acrylonitrile, methacrylonitrile, fumaronitriles, α-chloroacrylonitrile, α-cyanoethylacrylonitrile, and the like. Among these monomers, preferred are acrylonitrile and methacrylonitrile, and more preferred is acrylonitrile. These ethylenically unsaturated nitrile monomers can be used alone or in combination. The content of the ethylenically unsaturated nitrile monomer unit formed of the ethylenically unsaturated nitrile monomer in the nitrile group-containing conjugated diene copolymer is preferably 5 to 80 wt %, more preferably 15 to 70 wt %, still more preferably 20 to 60 wt %. Control of the content of the ethylenically unsaturated nitrile monomer unit within this range results in a foam rubber having a better feel and higher durability.

Examples of the different ethylenically unsaturated monomer copolymerizable with the conjugated diene monomer and the ethylenically unsaturated nitrile monomer include ethylenically unsaturated carboxylic acids such as (meth) acrylic acid, (anhydrous) maleic acid, fumaric acid, and itaconic acid; mono- or dialkyl esters of ethylenically unsaturated carboxylic acids such as methyl (meth)acrylate, ethyl (meth)acrylate, butyl (meth)acrylate, 2-ethylhexyl (meth)acrylate, lauryl (meth)acrylate, mono- or dimethyl maleate, mono- or diethyl fumarate, mono- or di-n-butyl fumarate, and mono- or di-n-butyl itaconate; alkoxy alkyl esters of ethylenically unsaturated carboxylic acids such as methoxy acrylate, ethoxy acrylate, and methoxyethoxyethyl acrylate; (meth)acrylates having hydroxyalkyl groups, such as 2-hydroxyethyl (meth)acrylate, hydroxypropyl (meth) acrylate, and hydroxybutyl (meth)acrylate; glycidyl (meth) acrylate; (meth)acrylic amides and derivatives thereof such as (meth)acrylamides, N-methylol(meth)acrylamide, and N-butoxymethyl(meth)acrylamide; acrylates having an amino group, such as dimethylaminomethyl acrylate and diethylaminomethyl acrylate; aromatic vinyl monomers such as styrene, α-methylstyrene, vinyltoluene, and chlorostyrene; α-olefins such as ethylene and propylene; non-conjugated diene monomers such as dicyclopentadiene vinyl norbornene; and the like. These monomers can be used alone or in combination. The content of the different monomer unit famed of the different ethylenically unsaturated monomer in the nitrile group-containing conjugated diene copolymer is preferably 40 wt % or less, more preferably 30 wt % or less, still more preferably 20 wt % or less. Control of the content of the different monomer unit within this range results in a foam rubber having a better feel and higher durability.

The polymer latex used in the present invention can be prepared by any method without limitation. The method can be any method of preparing a polymer latex having a solids content of 60.0 wt % or more, having a volume particle size distribution where the volume cumulative particle size d10 is more than 140 nm, and comprising 0.001 to 1.0 part by weight of antifoaming agent relative to 100 parts by weight of polymer in the polymer latex. Examples thereof include a method of using emulsion polymerization to copolymerize the monomers which form the polymer contained in the polymer latex, and subjecting the resulting emulsion to a particle size increasing treatment and concentration, and the like.

A conventional known method can be used as the emulsion polymerization method. For example, when a monomer mixture containing the monomers above is emulsion polymerized, polymerization additives usually used, such as an emulsifier (surfactant), a polymerization initiator, a chelating agent, an oxygen scavenger, a molecular weight adjuster, and the like can be used. These polymerization additives can be added by any method without limitation. The method can be any method such as initial one-time addition, portion-wise addition, continuous addition, or the like.

Examples of the emulsifier include, but should not be limited to, anionic emulsifiers, nonionic emulsifiers, and the like. Examples of the anionic emulsifiers include fatty acid salts such as potassium salts of beef tallow fatty acids, potassium salts of partially hydrogenated beef tallow fatty acids, potassium oleate, and sodium oleate; resin acid salts such as potassium rosinate, sodium rosinate, hydrogenated potassium rosinate, and hydrogenated sodium rosinate; alkylbenzene sulfonates such as sodium dodecylbenzene-sulfonate; and the like. Examples of the nonionic emulsifiers include polyethylene glycol ester emulsifiers, Pluronic emulsifiers such as block copolymers of ethylene oxide and propylene oxide, and the like. Among these emulsifiers, preferred are anionic emulsifiers, more preferred are fatty acid salts, and particularly preferred are potassium oleate and sodium oleate. These emulsifiers can be used alone or in combination. The amount of the emulsifier to be used is preferably 0.5 to 5 parts by weight relative to 100 parts by weight of the monomer mixture.

Examples of the polymerization initiator include, but should not be limited to, inorganic peroxides such as sodium persulfate, potassium persulfate, ammonium persulfate, potassium perphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, benzoyl peroxide, octanoyl peroxide, and 3,5,5-trimethylhexanoyl peroxide; azo compounds such as azobisisobutyronitrile, azobis-2,4-dimethylvaleronitrile, and methyl azobisisobutyrate; and the like. These polymerization initiators each can be used alone or in combination. The amount of the polymerization initiator to be used is preferably 0.01 to 10 parts by weight, more preferably 0.01 to 2 parts by weight relative to 100 parts by weight of the monomer mixture.

The peroxide initiator can be used as a redox polymerization initiator in combination with a reducing agent. Any reducing agent can be used without limitation. Examples thereof include compounds containing reduced metal ions, such as ferrous sulfate and cuprous naphthenate; sulfonic compounds such as sodium methanesulfonate; amine compounds such as dimethylaniline; and the like. These reducing agents can be used alone or in combination. The amount of the reducing agent to be used is preferably 3 to 1000 parts by weight relative to 100 parts by weight of the peroxide.

Examples of the molecular weight adjuster include alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethylxanthogen disulfide and diisopropylxanthogen disulfide; thiuram compounds such as tetramethylthiuram disulfide, tetraethylthiuram disulfide, and tetramethylthiuram monosulfide; phenol compounds such as 2,6-di-t-butyl-4-methylphenol and styrenated phenol; allyl compounds such as allyl alcohols; halogenated hydrocarbon compounds such as dichloromethane, dubromomethane, and carbon tetrabromide; α-benzyloxystyrene, α-benzyloxyacrylonitrile, α-benzyloxyacrylamide, triphenylethane, pentaphenylethane, acrolein, methacrolein, thioglycolic acid, thiomalic acid, 2-ethylhexyl thioglycolate, α-methylstyrene dimers, terpinolene, and the like. These molecular weight adjusters each can be used alone or in combination. The amount of the molecular weight adjuster to be used is preferably 0.1 to 3 parts by weight, more preferably 0.2 to 2 parts by weight, particularly preferably 0.3 to 1.5 parts by weight relative to 100 parts by weight of the monomer mixture. The resulting foam rubber can have improved strength by controlling the amount of the molecular weight adjuster to be used within this range.

The amount of water to be used during emulsion polymerization is preferably 80 to 600 parts by weight, particularly preferably 100 to 200 parts by weight relative to 100 parts by weight of the total monomers to be used.

The emulsion polymerization reaction can be performed in either of a continuous or batch-wise manner, and the conditions thereof, such as polymerization time, are not particularly limited. Examples of the method of adding the monomers include a method of adding the monomers to be used to a reaction container in one portion, a method of continuously or intermittently adding the monomers according to the progress of polymerization, a method of adding a portion of the monomers to react the monomers to a specific conversion ratio, and then continuously or intermittently adding the residual monomers to complete the polymerization. Any of these methods can be used. If the monomers are mixed and continuously or intermittently added, the composition of the mixture may be fixed or may be varied. The monomers to be used may be preliminarily mixed together and then placed into the reaction container, or each monomer may be separately placed into the reaction container. If a latex of a nitrile group-containing conjugated diene copolymer is prepared as the polymer latex by a method of initiating the polymerization reaction and then adding an additional portion of the monomers into the reactor to continue the polymerization, examples of the method include a method of adding the ethylenically unsaturated nitrile monomer and a portion of the conjugated diene monomer to the reactor to initiate the polymerization reaction, then adding the remaining conjugated diene monomer all at once or in portions to the reactor while the polymerization reaction ratio within the reactor is 20 to 65%, thereby further continuing the polymerization reaction. During this operation, the proportion of the conjugated diene monomer added after the initiation of the polymerization reaction is preferably 20 to 60 wt % of the total conjugated diene monomer used in the polymerization.

Furthermore, when emulsion polymerization is performed, polymerization additives such as a chelating agent, a dispersant, a pH adjuster, an oxygen absorbing agent, a particle size adjuster, and the like can be used as needed. These additives of any type can be used in any amount.

When the monomer mixture is emulsion polymerized as above to reach a predetermined polymerization conversion ratio, the polymerization reaction is terminated, for example, by cooling the polymerization system or adding a polymerization terminator. The polymerization can be terminated at any polymerization conversion ratio. The polymerization conversion ratio is preferably 90 wt % or more, more preferably 93 wt % or more. An excessively low polymerization conversion ratio tends to reduce productivity. Any polymerization temperature can be used. The polymerization temperature is preferably 0 to 50° C., more preferably 5 to 35° C.

Examples of the polymerization terminator include, but should not be limited to, hydroxylamine, hydroxyamine sulfurate, diethylhydroxylamine, hydroxyaminesulfonic acid and alkali metal salts thereof, sodium dimethyldithiocarbamate, hydroquinone derivatives, catechol derivatives, aromatic hydroxydithiocarboxylic acids (such as hydroxydimethylbenzenethiocarboxylic acid, hydroxydiethylbenzenedithiocarboxylic acid, and hydroxydibutylbenzenedithiocarboxylic acid) and alkali metal salts thereof, and the like. The amount of the polymerization terminator to be used is preferably 0.05 to 2 parts by weight relative to 100 parts by weight of the monomer mixture.

The polymerization reaction can be performed as described above to prepare an emulsion. After the polymerization reaction is terminated to obtain the emulsion, unreacted monomers may be removed from the emulsion as needed.

Furthermore, in the manufacturing method according to the present invention, after the polymerization reaction is terminated, the resulting emulsion is subjected to a particle size increasing treatment by combining polymer particles in the emulsion to increase the particle size. The polymer latex is thus prepared. By performing the particle size increasing treatment, the resulting polymer latex can have a particle size distribution within the desired range.

The particle size increasing treatment can be performed by any method without limitation. Examples thereof include (1) a method of adding a conjugated diene compound such as 1,3-butadiene and a solvent such as toluene to the emulsion after the termination of the polymerization, and strongly stirring the mixture, (2) a method of adding a particle size increasing agent such as a carboxyl group-containing polymer latex to the emulsion, and strongly mixing the mixture, and the like.

If the particle size increasing treatment is pertained by the method (1) above, the amount of the solvent to be added is preferably 30 to 300 parts by weight relative to 100 parts by weight of polymer in the emulsion. If the particle size increasing treatment is performed by the method (1) above, any stirring condition can be used. For example, the method is performed using a stirrer such as a stirring blade of a paddle type or the like at a rotational speed of preferably 50 to 2500 rpm for a stirring time of preferably 0.5 to 12.0 hours.

When the particle size increasing treatment is performed, to prevent foaming accompanied by stirring, it is preferred that an antifoaming agent be added to the emulsion to perform the particle size increasing treatment in the presence of the antifoaming agent.

After the particle size increasing treatment is performed to prepare the polymer latex, the polymer latex is preferably concentrated to control the solids content of the polymer latex. Any concentration method can be used without limitation. Examples thereof include reduced pressure distillation, normal pressure distillation, centrifugation, membrane concentration, and the like. Among these methods, preferred is reduced pressure distillation.

If the polymer latex is concentrated by reduced pressure distillation, as the concentration conditions, the pressure is preferably 100 to 0 kPa, more preferably 95 to 1.0 kPa, and the temperature is preferably 30 to 100° C., more preferably 40 to 95° C.

To prevent foaming also when the concentration is performed, it is preferred that an antifoaming agent be added to the polymer latex to perform the concentration in the presence of the antifoaming agent.

Any antifoaming agent can be used in the particle size increasing treatment and the concentration treatment without limitation. Examples thereof include fat and oil antifoaming agents, mineral oil antifoaming agents such as modified hydrocarbon oils containing mineral oils as a base, silicone antifoaming agents such as silicone oils, polymer antifoaming agents, and the like. Among these antifoaming agents, preferred are mineral oil antifoaming agents and silicone antifoaming agents. These antifoaming agents may be used alone or in combination. The antifoaming agent may be added during only any one of the particle size increasing treatment and the concentration treatment, or the same antifoaming agent or different antifoaming agents may be added during the two treatments. It is preferred that the antifoaming agent be added at least when the particle size increasing treatment is performed. In this case, the antifoaming agent can prevent foaming not only during the particle size increasing treatment but also during the concentration treatment performed after the particle size increasing treatment.

The total amount of antifoaming agent to be added during the particle size increasing treatment and the concentration treatment is preferably 0.001 to 1.0 part by weight, more preferably 0.001 to 1.00 part by weight, still more preferably 0.005 to 0.8 parts by weight, particularly preferably 0.005 to 0.6 parts by weight, most preferably 0.01 to 0.6 parts by weight relative to 100 parts by weight of polymer in the resulting polymer latex. If the amount of antifoaming agent to be added is less than 0.001 parts by weight, vigorous foaming may occur during the particle size increasing treatment. As a result, an appropriate particle size increase may be prevented and thus a desired particle size distribution may not be provided. Such vigorous foaming may also be caused when the concentration treatment is performed, resulting in a reduction in productivity of the polymer latex. In contrast, if the amount of antifoaming agent to be added is more than 1.0 part by weight, the final polymer latex may contain an excessive amount of antifoaming agent, resulting in a foam rubber having a poor appearance and having an excessively low Young's modulus and thus poor resilience.

In the manufacturing method according to the present invention, the polymer latex is controlled to have a solids content of 60.0 wt % or more, have a volume particle size distribution where the volume cumulative particle size d10 is more than 140 nm, and contain 0.001 to 1.0 part by weight of antifoaming agent relative to 100 parts by weight of polymer in the polymer latex. As a result, the foaming of the polymer latex can be more readily controlled and its handling properties can be enhanced. Furthermore, the foam rubber prepared using such a polymer latex can have a favorable appearance, have a low volume swelling ratio in water and thus high durability, and have a high Young's modulus and thus high resilience.

The solids content of the polymer latex used in the present invention is 60.0 wt % or more, preferably 62 wt % or more. An excessively low solids content results in a high foaming rate of the polymer latex, which leads to difficulties in control of the foaming. In addition, the foam rubber prepared using such a polymer latex has air bubbles whose diameter and density are not uniform, resulting in a poor appearance and in a low Young's modulus and thus inferior resilience. Although the upper limit of the solids content is not particularly limited, the upper limit is preferably 70 wt % or less to provide a polymer latex having excellent handling properties (to more appropriately perform transportation, compounding of the additives, and the like). The solids content of the polymer latex can be controlled with this range by any method. Examples thereof include a method of concentrating the polymer latex by the method described above such that the polymer latex has a desired solids content, and the like.

In the polymer latex used in the present invention, the volume cumulative particle size d10 (a particle size where the cumulative volume calculated from the smaller diameter end in the volume particle size distribution is 10%) is more than 140 nm, preferably 145 nm or more, more preferably 150 nm or more. An excessively small volume cumulative particle size d10 results in a polymer latex having poor handling properties, and a foam rubber having a high volume swelling ratio in water and inferior durability to water. The volume cumulative particle size d10 can be controlled within this range by any method. Examples thereof include a method of controlling the treatment conditions within the above ranges in the particle size increasing treatment, and the like.

Furthermore, the polymer latex used in the present invention contains the antifoaming agent in an amount of 0.001 to 1.0 part by weight, preferably 0.001 to 1.00 part by weight, more preferably 0.005 to 0.8 parts by weight, still more preferably 0.005 to 0.6 parts by weight, particularly preferably 0.01 to 0.6 parts by weight relative to 100 parts by weight of polymer in the polymer latex. An excessively small content of antifoaming agent prevents an appropriate particle size increase in the particle size increasing treatment. In contrast, an excessively large content of antifoaming agent results in a foam rubber having a poor appearance and having a low Young's modulus and thus inferior resilience. The content of the antifoaming agent in the polymer latex used in the present invention is substantially equal to the amount of antifoaming agent used in the preparation process. Accordingly, the content of the antifoaming agent may be controlled by adjusting the amount thereof to be used in the preparation process.

According to the present invention, by using a polymer latex in which the solids content, the volume cumulative particle size d10, and the content of the antifoaming agent are controlled within the ranges specified above, an appropriate foaming rate of the polymer latex can be obtained, further facilitating the control of the foaming and resulting in a polymer latex having excellent handling properties. Furthermore, the foam rubber prepared using such a polymer latex can have a good appearance, a low volume swelling ratio in water and thus high durability, and a high Young's modulus and thus high resilience.

Although the volume cumulative particle size d10 within the range specified above suffices in the polymer latex used in the present invention, the volume cumulative particle size d50 (the particle size where the cumulative volume is 50% in the volume particle size distribution) is preferably 400 nm or more, more preferably 450 nm or more, still more preferably 500 nm or more. A volume cumulative particle size d50 controlled within this range can further improve the handling properties of the polymer latex, and results in a foam rubber having a low volume swelling ratio in water and higher durability. Although the upper limit of the volume cumulative particle size d50 is not particularly limited, the upper limit is preferably 3000 nm or less because an excessively low viscosity of the polymer latex can be prevented through control, and the foam rubber can be more appropriately formed. The volume cumulative particle size d50 can be controlled within this range by any method. Examples thereof include a method of setting the treatment conditions in the particle size increasing treatment within the ranges above, and the like.

Furthermore, in the polymer latex used in the present invention, the volume cumulative particle size d90 (a particle size where the cumulative volume is 90% in the volume particle size distribution) is preferably 1000 nm or more, more preferably 1200 nm or more, still more preferably 1500 nm or more. A volume cumulative particle size d90 controlled within this range can further improve the handling properties of the polymer latex, and results in a foam rubber having a low volume swelling ratio in water and high durability. Although the upper limit of the volume cumulative particle size d90 is not particularly limited, the upper limit is preferably 20000 nm or less because an excessively low viscosity of the polymer latex can be prevented through control and the foam rubber can be more appropriately formed. The volume cumulative particle size d90 can be controlled within this range by any method. Examples thereof include a method of setting the treatment conditions in the particle size increasing treatment within the ranges above, and the like.

In the measurement of the volume particle size distribution of the polymer latex used in the present invention, the volume particle size distribution has preferably two or more maxima, particularly preferably two maxima (bimodality). Furthermore, if the volume particle size distribution has two or more maxima, the ratio ($h_{2nd}/h_{1st}$) of the height $h_{2nd}$ of the second peak counted from the smaller diameter end to the height $h_{1st}$ of the peak closest to the smaller diameter end of the volume particle size distribution is preferably 1.8 or more, more preferably 1.9 or more. At this time, if the volume particle size distribution has two maxima (bimodality), the height of the peak at the smaller diameter corresponds to $h_{1st}$ and the height of the peak at the larger diameter corresponds to $h_{2nd}$. It is preferred that the ratio ($h_{2nd}/h_{1st}$) of the heights of these peaks be controlled within the range specified above. Control of the volume particle size distribution for the polymer latex within the above range results in a polymer latex having higher handling properties. In addition, the foam rubber prepared using such a polymer latex can have a further reduced volume swelling ratio in water, resulting in higher durability to water. The volume particle size distribution having two or more maxima for the polymer latex can be obtained by any method, and the peak ratio ($h_{2nd}/h_{1st}$) can be controlled within the above range by any method. Examples thereof include a method of setting the treatment condition in the particle size increasing treatment within the range above, and the like.

Furthermore, if the volume particle size distribution has two or more maxima, the particle size $d_{1st}$ of the peak closest to the smaller diameter end of the volume particle size distribution is preferably 50 to 700 nm, more preferably 100 to 600 nm, still more preferably 150 to 500 nm. The particle size $d_{2nd}$ of the second peak counted from the smaller diameter end is preferably 900 to 5000 nm, more preferably 900 to 4000 nm, still more preferably 950 to 3000 nm. At this time, if the volume particle size distribution has two maxima (bimodality), the particle size of the peak at the smaller diameter corresponds to $d_{1st}$, and the particle size of the peak at the larger diameter corresponds to $d_{2nd}$. Control of the particle size $d_{1st}$ and the particle size $d_{2nd}$ within these ranges can further improve the handling properties of the polymer latex, and results in a foam rubber having a low volume swelling ratio in water and high durability. The particle size $d_{1st}$ and the particle size $d_{2nd}$ can be controlled within the ranges above by any method. Examples thereof include a method of setting the treatment conditions in the particle size increasing treatment within the ranges above, and the like.

As described above, the polymer latex used in the present invention may comprise two or more polymers. For example, a latex comprising a diene copolymer and a urethane polymer can be used which is prepared by blending a latex of a diene copolymer such as a nitrile group-containing conjugated diene copolymer with a latex of a urethane polymer. In this case, the content of the urethane polymer is preferably 5 to 95 parts by weight, more preferably 15 to 70 parts by weight, still more preferably 15 to 50 parts by weight relative to 100 parts by weight of polymer in the polymer latex (the total amount of the diene copolymer and the urethane polymer).

Any urethane polymer latex can be used without limitation. Examples thereof include a latex prepared by mixing an aqueous solution containing a neutralizer with a solution or dispersion of an urethane resin having a hydrophilic group in an organic solvent, the urethane resin being prepared by reacting an active hydrogen-containing compound with a compound having a hydrophilic group and a polyisocyanate. An alternative urethane polymer latex may be used, which is prepared by reacting an active hydrogen-containing compound with a compound having a hydrophilic group and an polyisocyanate to prepare a terminal isocyanate group-containing urethane prepolymer having a hydrophilic group, and mixing an aqueous solution containing a neutralizer and polyamine with the terminal isocyanate group-containing urethane prepolymer to react the polyamine with the prepolymer.

Any active hydrogen-containing compound can be used without limitation. Examples thereof include polyols such as polyester polyols, polyether polyols, polycarbonate polyols, polyacetal polyols, polyacrylate polyols, polyesteramide polyols, polythioether polyols, and polyols of polyolefins such as polybutadiene; polyhydroxy compounds of glycol compounds used as raw materials for polyester polyols, glycerol, trimethylolethane, trimethylolpropane, sorbitol, and pentaerythritol; amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, 1,2-propanediamine, hydrazine, diethylenetriamine, and triethylenetetramine; and the like.

Any compound having a hydrophilic group can be used without limitation. Examples thereof include ionic compounds having one or more active hydrogen atoms in the molecule and having at least one functional group selected from the group consisting of a carboxylic salt group, a sulfonic salt group, a phosphoric salt group, a quaternary ammonium salt group, a carboxylic acid group, a sulfonic acid group, a phosphoric acid group, a tertiary amino group, and a betaine group; and nonionic compounds having one or more active hydrogen atoms in the molecule and having a group comprising a repeating unit of ethylene oxide or a group comprising a repeating unit of ethylene oxide and a repeating unit of another alkylene oxide; and the like.

Any isocyanate can be used without limitation. Examples thereof include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenating xylylene diisocyanate, lysine diisocyanate, isophorone diisocyanate, 4,4'-dicyclohexylmethane diisocyanate, 3,3'-dimethyl-4,4'-dicyclohexylmethane diisocyanate, and the like.

<Polymer Latex Composition>

It is preferred that the polymer latex used in the present invention be compounded with a compounding agent such as a cross-linking agent. In other words, it is preferred that the polymer latex used in the present invention be used in the form of a polymer latex composition.

Examples of the cross-linking agent include sulfurs such as powdery sulfur, flowers of sulfur, precipitated sulfur, colloidal sulfur, surface-treated sulfur, and insoluble sulfur; and sulfur-containing compounds such as sulfur chloride, sulfur dichloride, morpholine disulfide, alkylphenol disulfides, N,N'-dithio-bis(hexahydro-2H-azepin-2-one), phosphorus-containing polysulfides, polymer polysulfides, and 2-(4'-morpholinodithio)benzothiazole. Among these cross-linking agents, sulfur can be preferably used. These cross-linking agents can be used alone or in combination.

Although the content of the cross-linking agent is not particularly limited, the content is preferably 0.1 to 10 parts by weight, more preferably 0.2 to 3 parts by weight relative to 100 parts by weight of polymer in the polymer latex. A content of the cross-linking agent controlled within this range results in a foam rubber having further enhanced strength.

It is preferred that the polymer latex used in the present invention further contain a cross-linking accelerator.

The cross-linking accelerator can be those usually used in the manufacturing of foam rubbers. Examples thereof include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid and zinc salts thereof; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthiocarbamoylthio)benzothiazole, 2-(2,6-dimethyl-4-morpholinothio)benzothiazole, 2-(4'-morpholinodithio) benzothiazole, 4-morpholinyl-2-benzothiazyl disulfide, 1,3-bis(2-benzothiazyl mercaptomethyl)urea, and the like. Preferred are zinc diethyldithiocarbamate, zinc dibutyldithiocarbamate, and zinc 2-mercaptobenzothiazole. These cross-linking accelerators can be used alone or in combination.

The content of the cross-linking accelerator is preferably 0.1 to 5 parts by weight, more preferably 0.2 to 4 parts by weight relative to 100 parts by weight of polymer in the polymer latex. A content of the cross-linking accelerator controlled within this range results in a foam rubber having further enhanced strength.

Furthermore, it is preferred that the polymer latex used in the present invention contain zinc oxide.

Although the content of zinc oxide is not particularly limited, the content is preferably 0.5 to 10 parts by weight, more preferably 0.5 to 8 parts by weight relative to 100 parts by weight of polymer in the polymer latex. A content of zinc oxide controlled within this range can provide high emulsion stability, and can further enhance the strength of the resulting foam rubber.

Furthermore, an antioxidant, a colorant, a foam stabilizer, and the like, a dispersant for stably dispersing the variety of compounding agents listed above (such as NASF (the sodium salt of the naphthalene sulfonic acid-formaldehyde condensate)), a thickener (such as polyacrylic acid and sodium salts thereof, sodium alginate, or poly(vinyl alcohol)), a surfactant as a foaming agent (such as an aliphatic alkali soap such as potassium oleate, or a sulfate of higher alcohols such as sodium dodecylsulfate) can be compounded with the polymer latex used in the present invention as needed.

Such a variety of compounding agents can be mixed with the polymer latex by any method. Examples thereof include a method of preparing the polymer latex as described above, and mixing a variety of compounding agents, which are compounded as needed, with the polymer latex using a dispersing machine such as a ball mill, a kneader, a disper, or the like; a method of preparing an aqueous dispersion of compounding components other than the polymer latex using the dispersing machine, and mixing the aqueous dispersion with the polymer latex; and the like. The cross-linking agent may be added to the polymer latex before the polymer latex is foamed, or the polymer latex may be foamed and then the cross-linking agent may be added to the foamed polymer latex.

<Foam Rubber>

In the manufacturing method according to the present invention, a foam rubber can be prepared by foaming the polymer latex described above at a desired foaming ratio and solidifying the foamed polymer latex. Although air is usually used in foaming, a carbonate such as ammonium carbonate or sodium bicarbonate; an azo compound such as azodicarboxylic amide or azobisisobutyronitrile; a gas generating substance such as benzenesulfonyl hydrazide; or the like can also be used. If air is used, the polymer latex can be foamed by stirring the polymer latex to take the air thereinto. In this operation, an Oakes foaming machine, an ultrasonic foaming machine, or the like can be used, for example.

After the polymer latex is foamed, the foamed polymer latex is solidified to fix the foamed state. Any solidifying method which enables gelation and solidification of the latex can be used, and traditionally known methods can be used. Examples thereof include the Dunlop method (solidification at normal ambient temperature) of adding a normal-temperature solidifying agent, e.g., a silicon fluoride compound such as sodium hexafluorosilicate (sodium silicofluoride), potassium hexafluorosilicate (potassium silicofluoride), sodium titanium silicofluoride, or the like to the polymer latex; a heat-sensitive solidification method of adding a heat-sensitive solidifying agent such as organopolysiloxane, poly(vinyl methyl ether), or a zinc ammonium sulfate complex to the foamed polymer latex; a freeze-drying solidification method; and the like. The solidifying agent such as the normal-temperature solidifying agent or the heat-sensitive solidifying agent can be used in any amount. The amount thereof to be used is preferably 0.2 to 10 parts by weight, more preferably 0.5 to 8 parts by weight relative to 100 parts by weight of polymer in the polymer latex.

The foamed polymer latex can be famed into a foam rubber by adding the solidifying agent to the foamed polymer latex, placing the latex into a mold having a desired shape, and solidifying the latex. If the cross-linking agent is compounded with the polymer latex, it is preferred that the polymer latex be solidified, and then be cross-linked by heating. As the cross-linking condition, the heat treatment can be performed at a temperature of preferably 100 to 160° C. for a time of preferably 15 to 60 minutes.

It is preferred that the resulting foam rubber be removed from the mold, and be washed. The foam rubber can be washed by any method. Examples thereof include a method of washing the foam rubber with water at about 20 to 70° C. using a washing machine or the like by stirring for about 5 to 15 minutes. It is preferred that after the washing, water be drained, and the foam rubber be dried at a temperature of about 30 to 90° C. without impairing the feel of the foam rubber. The foam rubber thus produced can be used as puffs (cosmetic sponges) and the like by slicing and cutting into a predetermined thickness and a predetermined shape, and polishing the lateral surfaces of the products with a rotary grinding wheel.

The foam rubber can be produced as described above in the manufacturing method according to the present invention. The foam rubber produced by the manufacturing method according to the present invention is prepared using the polymer latex according to the present invention described above. Accordingly, such a foam rubber has an excellent foaming state, and also has high resilience and durability. For this reason, the foam rubber can be suitably used in a variety of applications such as mattresses, puffs (cosmetic sponges), rolls, shock absorbers, and the like. In particular, because the foam rubber produced by the manufacturing method according to the present invention has high durability to water, such a foam rubber can be suitably used as puffs (cosmetic sponges) intended to be impregnated with aqueous cosmetics and the like.

EXAMPLES

Hereinafter, the present invention will be more specifically described by way of Examples, but these Examples should not be construed as limitation to the present invention. In the description below, the tam "parts" is weight-based unless otherwise specified. The methods of testing or evaluating the physical properties and characteristics are as shown below.

Solids Content of Polymer Latex 2 g of a sample (weight: X2) was precisely weighed. The sample was placed onto an aluminum plate (weight: X1), and was dried in a hot air dryer at 105° C. for two hours. The sample was then cooled inside a desiccator, and the weight of the sample with the aluminum plate (weight: X3) was measured to calculate the solids content from the expression:

$$\text{solids content (wt \%)} = (X3-X1) \times 100/X2$$

Volume Particle Size Distribution

The volume particle size distribution of the polymer latex was measured using a light scattering diffraction particle size analyzer (type "LS-13320", available from Beckman Coulter, Inc.). Based on the volume particle size distribution obtained in the measurement, the volume cumulative particle size d10, the volume cumulative particle size d50, and the volume cumulative particle size d90 were determined. The particle size $d_{1st}$ and the peak height $h_{1st}$ of the peak closest to the smaller diameter end of the volume particle size distribution were determined. Furthermore, the particle size $d_{2nd}$ and the peak height $h_{2nd}$ of the second peak counted from the smaller diameter end of the volume particle size distribution were determined. Based on the determined peak heights $h_{1st}$ and $h_{2nd}$, the ratio ($h_{2nd}/h_{1st}$) of the peak heights was calculated.

Viscosity of Polymer Latex (Solids Content: 66.0 wt %)

The solids content of the polymer latex was adjusted to 66.0 wt %, and the B type viscosity was measured at a temperature of 25° C. and a rotational speed of 60 rpm using a B type viscometer.

Handling Properties of Polymer Latex

The polymer latex was filtered through a 200-mesh metal screen, and how the polymer latex behaved when being filtered was observed to evaluate the handling properties (handling properties during transportation of the latex and compounding thereof with additives) according to the following criteria:

1: The polymer latex has significantly high viscosity and difficulties in filtration.
2: The polymer latex has high viscosity, reducing the flow rate in filtration.
3: The polymer latex is readily filtered.

Foaming State

After one minute from the start of foaming of the latex composition, the density of the foamed latex composition was measured. From the measured density, the volume ($V_2$) of the foamed latex composition was determined. The volume expansion ratio ($V_2/V_1 \times 100$) of the volume ($V_2$) to the volume ($V_1$) of the latex composition before the foaming was calculated to evaluate the foaming state of the latex composition according to the following criteria. In the following criteria, it was determined that if the volume expansion ratio of the latex composition is within an appropriate range, the latex composition has an appropriate foaming rate and thus the foaming thereof can be more readily controlled.

1: The volume expansion ratio is more than 1000%, and the foaming of the latex composition is difficult to control due to excessively rapid foaming.
2: The volume expansion ratio is within the range of 110 to 1000%, and the foaming of the latex composition is readily controlled.

Appearance of Foam Rubber

The appearance of the foam rubber was visually observed, and was evaluated according to the following criteria:

1: The diameter and density of air bubbles are not uniform.
2: A large number of large air bubbles having a diameter of 0.3 mm or more are present.
3: The diameter and density of air bubbles are uniform, and large air bubbles having a diameter 0.3 mm or more are barely found.

Volume Swelling Ratio (Linear Expansion Ratio) of Foam Rubber

A platy foam rubber having a thickness of 0.8 cm was punched into a circular shape having a diameter of about 38 mm to prepare a test piece. The test piece was immersed in tap water at 23° C. for 48 hours to determine the volume swelling ratio (linear expansion ratio) (%) from the following expression:

$$\text{linear expansion ratio (\%)} = [(L'-L)/L] \times 100$$

(L: diameter before immersion, L': diameter after immersion)

It was determined that a lower linear expansion ratio indicates higher durability to water.

Young's Modulus of Foam Rubber

The foam rubber was cut into a shape of 30 mm×30 mm to prepare a sample for measurement. The Young's modulus of the sample for measurement was measured with a softness analyzing system (type "SOFTMEASURE HG1003-SL", available from HORIUCHI ELECTRONICS CO., LTD.). Specifically, a resin tape was applied to a portion of the sample for the measurement corresponding to a plurality of suction holes of the suction base disposed in the softness analyzing system, and the sample for measurement was placed on the suction base through the resin tape. The measurement was performed on the following condition by pressing a spherical indenter into the surface of the sample for measurement while the sample for measurement was being sucked. In the measurement, three samples were prepared for each of Examples and Comparative Examples. The average of the three results in the measurement was defined as the Young's modulus for each of Examples and that of Comparative Examples.

Spherical indenter: spherical indenter made of SUS and having a diameter of 10 mm Pressing rate: 0.5 mm/s Example 1

Preparation of Polymer Latex 200 parts of water, 1.5 parts of potassium oleate, 38 parts of acrylonitrile, 0.5 parts of t-dodecyl mercaptan, 0.03 parts of sodium formaldehyde sulfoxylate, 0.003 parts of ferrous sulfate, and 0.008 parts of sodium ethylenediaminetetraacetate were placed into a pressure-resistant reaction container. The reaction container was sufficiently degassed, and 45 parts of 1,3-butadiene and 17 parts of isoprene were added.

In the next step, 0.05 parts of cumene hydroperoxide as a polymerization initiator was added to initiate emulsion polymerization at a reaction temperature of 5° C. When the polymerization conversion ratio reached 95%, a polymerization terminator solution comprising 0.25 parts of diethylhydroxylamine and 5 parts of water was added to terminate the polymerization reaction. An emulsion was thereby prepared.

Subsequently, unreacted monomers were removed from the emulsion, 0.01 parts of modified hydrocarbon oil (trade name "DF714 S", and available from SEIKO PMC CORPORATION) containing a mineral oil as a base was added as an antifoaming agent. In the next step, 80 parts of 1,3-butadiene as a solvent was added to the emulsion. The temperature inside the system was controlled to 15° C. Using a paddle type stirring blade, the system was strongly stirred at a rotational speed of 1000 rpm for a stirring time of 5 hours to perform a particle size increasing treatment. In the next step, 1,3-butadiene was removed, and a concentration treatment was performed at 70° C. under a reduced pressure of 50.0 kPa to prepare a polymer latex (solids content: 66.4 wt %). The polymer latex was evaluated for the volume particle size distribution, the viscosity of the polymer latex (solids content: 66.0 wt %), and the handling properties of the polymer latex according to the methods described above. The results are shown in Table 1. Because the content of the antifoaming agent in the polymer latex was substantially equal to the amount of the antifoaming agent used in the preparation of the polymer latex, the amount of the antifoaming agent used in the preparation of the polymer latex is shown under the content of the antifoaming agent in Table 1 (the same applies to Examples 2 and 3 and Comparative Examples 1 to 5 described later).

Preparation of Polymer Latex Composition 4 parts of a vulcanization system aqueous dispersion (colloidal sulfur/a dithiocarbamate vulcanization accelerator NOCCELER EZ (available from Ouchi Shinko Chemical Industrial Co., Ltd.)/a thiazole vulcanization accelerator NOCCELER MZ (available from Ouchi Shinko Chemical Industrial Co., Ltd.)=2/1/1 (weight ratio), solids content: 50%), 3 parts of an aqueous dispersion of zinc oxide (solids content: 50%), and 1 part of a foam stabilizer (TRIMENE BASE: available from Crompton Corp.) were added relative to 100 parts of polymer in the polymer latex, and were sufficiently dispersed to prepare a polymer latex composition.

Manufacturing of Foam Rubber

The polymer latex composition was stirred using a stand mixer (type "ESM945", available from Electrolux AB) to foam the polymer latex composition about five times in terms of volume. 3.0 parts of an aqueous dispersion of sodium silicofluoride (solids content: 20%) was added, and the mixture was further stirred for 1 minute to yield a foamed product. At this time, the foaming state of the latex composition was evaluated according to the method described above. The results are shown in Table 1.

In the next step, the foamed product was poured into a mold for molding (diameter: 7 cm, height: 8 cm), was solidified, and was vulcanized by heating at 110° C. for one hour. Subsequently, after removed from the mold, the resulting product was washed with water at 40° C. for 10 minutes, and was further dried in an oven at 60° C. for 4 hours. The product was cut into a thickness of 0.8 cm in the height direction to obtain a disk-shaped foam rubber. The foam rubber was evaluated for the appearance, the volume swelling ratio, and the Young's modulus according to the methods described above. The results are shown in Table 1.

Example 2

A polymer latex and a foam rubber were prepared in the same manner as in Example 1 except that the amount of the antifoaming agent used was changed from 0.01 parts to 0.02 parts, and the rotational speed was changed to 1200 rpm and the stirring time was changed to 4.8 hours as the conditions for the particle size increasing treatment. The polymer latex and the foam rubber were evaluated in the same manner as above. In Example 2, the solids content of the polymer latex after the concentration treatment was 66.1 wt %. The results are shown in Table 1.

Example 3

A polymer latex and a foam rubber were prepared in the same manner as in Example 1 except that the amount of the antifoaming agent used was changed from 0.01 parts to 0.1 parts, and the rotational speed was changed to 900 rpm and the stirring time was changed to 4.5 hours as the conditions for the particle size increasing treatment. The polymer latex and the foam rubber were evaluated in the same manner as above. In Example 3, the solids content of the polymer latex after the concentration treatment was 66.0 wt %. The results are shown in Table 1.

Comparative Example 1

A polymer latex and a foam rubber were prepared in the same manner as in Example 1 except that the rotational speed was changed to 800 rpm and the stirring time was changed to 0.4 hours as the conditions for the particle size increasing treatment. The polymer latex and the foam rubber were evaluated in the same manner as above. In Comparative Example 1, the solids content of the polymer latex after the concentration treatment was 55.0 wt %. The results are shown in Table 1.

Comparative Example 2

A foam rubber was produced in the same manner as in Example 1 except that the polymer latex in Example 1 was diluted to a solids content of 55.0%, and the diluted polymer latex was used. The diluted polymer latex and the foam rubber were evaluated in the same manner as in Example 1. The results are shown in Table 1.

Comparative Example 3

A mixed polymer latex was prepared by mixing the polymer latex in Example 1 with the polymer latex in Example 1 before the particle size increasing treatment such that the amount of the polymer latex in Example 1 before the particle size increasing treatment was 10 wt %. In the next step, using the mixed polymer latex, a foam rubber was produced in the same manner as in Example 1. The mixed polymer latex and the foam rubber were evaluated in the same manner as in Example 1. In Comparative Example 3, the solids content of the mixed polymer latex was 66.2 wt %. The results are shown in Table 1.

Comparative Example 4

A polymer latex was prepared in the same manner as in Example 2 except that the amount of the antifoaming agent used was changed from 0.02 parts to 0.1 parts. A mixed polymer latex was prepared by mixing the polymer latex with the polymer latex in Example 2 before the particle size increasing treatment such that the amount of the polymer latex in Example 2 before the particle size increasing treatment was 10 wt %. In the next step, using the mixed polymer latex, a foam rubber was produced in the same manner as in Example 1. The mixed polymer latex and the foam rubber were evaluated in the same manner as in Example 1. In Comparative Example 4, the solids content of the mixed polymer latex was 66.0 wt %. The results are shown in Table 1.

Comparative Example 5

0.99 parts of the antifoaming agent was further added to the polymer latex in Example 2. A foam rubber was produced in the same manner as in Example 1 except that the polymer latex after the addition of the antifoaming agent was used. The polymer latex after the addition of the antifoaming agent and the foam rubber were evaluated in the same manner as in Example 1. The results are shown in Table 1.

TABLE 1

| | | Example | | | Comparative Example | | | | |
|---|---|---|---|---|---|---|---|---|---|
| | | 1 | 2 | 3 | 1 | 2 | 3 | 4 | 5 |
| Polymer latex | | | | | | | | | |
| Solids content | (wt %) | 66.4 | 66.1 | 66.0 | 55.0 | 55.0 | 66.2 | 66.0 | 66.1 |
| Content of antifoaming agent | (parts) | 0.01 | 0.02 | 0.1 | 0.01 | 0.01 | 0.01 | 0.1 | 1.01 |
| Volume particle size distribution | | | | | | | | | |
| Volume cumulative particle size d10 | (nm) | 169 | 162 | 147 | 92 | 169 | 140 | 133 | 162 |
| Volume cumulative particle size d50 | (nm) | 1304 | 660 | 620 | 278 | 1304 | 642 | 566 | 660 |
| Volume cumulative particle size d90 | (nm) | 6400 | 1400 | 1580 | 1190 | 6400 | 1700 | 1500 | 1400 |
| Particle size $d_{1st}$ at first peak | (nm) | 305 | 310 | 300 | 200 | 305 | 210 | 285 | 310 |
| Height $h_{1st}$ of first peak | (%) | 2.9 | 2.8 | 3.1 | 3.1 | 2.9 | 2.5 | 2.8 | 2.8 |
| Particle size $d_{2nd}$ at second peak | (nm) | 1160 | 1260 | 1190 | 656 | 1160 | 880 | 870 | 1260 |
| Height $h_{2nd}$ of second peak | (%) | 5.9 | 5.6 | 5.6 | 3 | 5.9 | 4.2 | 4.2 | 5.6 |
| $h^{2nd}/h^{1st}$ | | 2.1 | 2.0 | 1.8 | 0.9 | 2.1 | 1.7 | 1.5 | 2.0 |
| Evaluation | | | | | | | | | |
| Viscosity of polymer latex (solids content: 66.0 wt %) | (cps) | 243 | 236 | 292 | 550 | 180 | 383 | 440 | 236 |
| Handling properties of polymer latex | | 3 | 3 | 3 | 1 | 3 | 2 | 2 | 3 |
| Foaming state | | 2 | 2 | 2 | 1 | 1 | 2 | 2 | 2 |
| Appearance of foam rubber | | 3 | 3 | 3 | 1 | 1 | 3 | 3 | 2 |
| Volume swelling ratio of foam rubber | (%) | 6.8 | 5.9 | 6.9 | 10.5 | 7.1 | 9.4 | 9.0 | 5.0 |
| Young's modulus of foam rubber | (kPa) | 58.1 | 46.7 | 61.3 | 19.9 | 6.2 | 39.5 | 56.7 | 27.4 |

As illustrated in Table 1, an appropriate foaming rate, easy control of the foaming, and excellent handling properties were attained in the polymer lattices controlled to have a solids content of 60.0 wt % or more, have a volume particle size distribution where the volume cumulative particle size d10 was more than 140 nm, and contain 0.001 to 1.0 part by weight of antifoaming agent relative to 100 parts by weight of polymer. In addition, the foam rubbers prepared using the polymer lattices were confirmed to have a good appearance, high durability due to a low volume swelling ratio in water, and high resilience due to a high Young's modulus (Examples 1 to 3).

In contrast, the polymer lattices having an excessively low solids content had difficulties in control of the foaming due to their excessively high foaming rate. In addition, the foam rubbers prepared using the polymer lattices had air bubbles whose diameter and density were not uniform, resulting in a poor appearance. The foam rubbers had a low Young's modulus, indicating inferior resilience (Comparative Examples 1 and 2).

The polymer lattices having a volume particle size distribution with an excessively small volume cumulative particle size d10 had inferior handling properties. In addition, the foam rubbers prepared using the polymer lattices had a high volume swelling ratio in water, indicating inferior durability (Comparative Examples 1, 3, and 4).

Furthermore, the foam rubber prepared using a polymer latex containing an excessively large amount of antifoaming agent had a poor appearance due to the presence of a large number of large air bubbles. The foam rubber had a low Young's modulus, indicating inferior resilience (Comparative Example 5).

The invention claimed is:

1. A method for manufacturing a foam rubber, comprising foaming a polymer latex,
    wherein the polymer latex used has a solids content of 60.0 wt % or more, has a volume particle size distribution where a volume cumulative particle size d10 is more than 140 nm, and comprises 0.001 to 0.1 part by weight of antifoaming agent relative to 100 parts by weight of polymer in the polymer latex,
    the volume particle size distribution of the polymer latex has two or more maxima,
    the polymer latex has a ratio of a height $h_{2nd}$ to a height $h_{1st}$ ($h_{2nd}/h_{1st}$) of 1.8 or more, where the height $h_{1st}$ represents the height of the peak closest to the smaller diameter end of the volume particle size distribution, and the height $h_{2nd}$ represents the height of the second peak counted from the smaller diameter end of the particle size distribution,
    the particle size $d_{1st}$ of the peak closest to the smaller diameter end of the volume particle size distribution is 150 to 500 nm,
    the particle size $d_{2nd}$ of the second peak counted from the smaller diameter end is 950 to 3000 nm,
    a polymer forming the polymer latex is a nitrile group containing conjugated diene copolymer containing acrylonitrile, butadiene and isoprene units, an amount of the acrylonitrile unit is 20 to 60 wt % and a total amount of the butadiene and isoprene units is 40 to 80 wt %, and
    the antifoaming agent is at least one selected from the group consisting of a mineral oil antifoaming agent and a silicone antifoaming agent.

2. The method for manufacturing a foam rubber according to claim 1,
    wherein in the volume particle size distribution of the polymer latex, the volume cumulative particle size d50 is 400 nm or more.

3. The method for manufacturing a foam rubber according to claim 1,
    wherein in the volume particle size distribution of the polymer latex, the volume cumulative particle size d90 is 1000 nm or more.

4. The method for manufacturing a foam rubber according to claim 1,
    wherein the antifoaming agent is at least a mineral oil antifoaming agent.

5. The method for manufacturing a foam rubber according to claim 1,
    wherein the antifoaming agent is at least a silicone antifoaming agent.

6. The method for manufacturing a foam rubber according to claim 1, wherein the ratio of the butadiene unit to the isoprene unit in the nitrile group-containing conjugated diene copolymer is in the range of 5/5 to 9/1.

7. The method for manufacturing a foam rubber according to claim 1, wherein d10 is 150 nm or more.

8. The method for manufacturing a foam rubber according to claim 2, wherein d50 is 500 nm or more.

9. The method for manufacturing a foam rubber according to claim 3, wherein d90 is 1500 nm or more.

* * * * *